US012505952B2

(12) United States Patent
Ma et al.

(10) Patent No.: US 12,505,952 B2
(45) Date of Patent: Dec. 23, 2025

(54) INSULATION DEVICE AND ELECTRICAL DEVICE HAVING THE SAME

(71) Applicant: Delta Electronics (Shanghai) Co., Ltd., Shanghai (CN)

(72) Inventors: Peng Ma, Shanghai (CN); Yicong Xie, Shanghai (CN); Weiqiang Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 930 days.

(21) Appl. No.: 17/655,368

(22) Filed: Mar. 18, 2022

(65) Prior Publication Data

US 2022/0301765 A1 Sep. 22, 2022

(30) Foreign Application Priority Data

Mar. 22, 2021 (CN) ........................ 202110301298.X

(51) Int. Cl.
*H01F 27/32* (2006.01)
*H01F 30/06* (2006.01)

(52) U.S. Cl.
CPC ........... *H01F 27/324* (2013.01); *H01F 30/06* (2013.01)

(58) Field of Classification Search
CPC ... H01F 27/324; H01F 2027/329; H01F 30/06
USPC .......................................................... 336/207
See application file for complete search history.

(56) References Cited

U.S. PATENT DOCUMENTS 4,206,382 A * 6/1980 DuBois .................... H01J 5/24 313/496
5,025,489 A * 6/1991 Yamaguchi ............ H05B 6/129 361/818
6,028,266 A * 2/2000 Birke .................. H05K 9/0003 174/388
9,548,600 B2 * 1/2017 Goeschel ................ H02G 5/06
11,783,987 B2 * 10/2023 Zhang .................. H01F 27/324 336/90
2014/0368389 A1 * 12/2014 Inamura ................. H01F 38/14 343/788
2021/0134511 A1 * 5/2021 Zhang .................. H01F 27/327

FOREIGN PATENT DOCUMENTS

CN 1868007 A 11/2006
CN 203746591 U 7/2014
CN 104020361 A 9/2014

(Continued)

*Primary Examiner* — Mang Tin Bik Lian
*Assistant Examiner* — Joselito S. Baisa
(74) *Attorney, Agent, or Firm* — CKC & Partners Co., LLC

(57) ABSTRACT

An insulation device includes an insulating part, and at least one conductive part located on at least one surface of the insulating part, wherein the at least one surface of the insulating part facing the at least one conductive part has central concave shape. A longitudinal section of the at least one conductive part includes a straight portion in the middle and two curved portions extending outwardly from both ends of the straight portion. The curved portions satisfy:

$$\begin{cases} x = A\left(\phi + \frac{1}{2}\left(e^{(\phi+i\varphi)} + e^{(\phi-i\varphi)}\right)\right) \\ y = A\left(\varphi + \frac{1}{2i}\left(e^{(\phi+i\varphi)} - e^{(\phi-i\varphi)}\right)\right) \end{cases}.$$

24 Claims, 12 Drawing Sheets

(56) References Cited

FOREIGN PATENT DOCUMENTS

| | | | | | |
|---|---|---|---|---|---|
| CN | 205050689 | U | | 2/2016 | |
| CN | 105808881 | A | | 7/2016 | |
| CN | 108831716 | B | | 11/2019 | |
| CN | 112750607 | A | * | 5/2021 | ............. H01F 27/29 |
| CN | 218849255 | U | * | 4/2023 | |
| CN | 110848819 | B | * | 7/2025 | .............. F24F 11/89 |
| EP | 0951025 | A1 | | 10/1999 | |
| JP | H0969321 | A | * | 3/1997 | |
| JP | 2013085417 | A | | 5/2013 | |
| RU | 149854 | U1 | | 1/2015 | |

* cited by examiner

INSULATION DEVICE AND ELECTRICAL DEVICE HAVING THE SAME

CROSS-REFERENCE TO RELATED APPLICATIONS

This non-provisional application claims priority under 35 U.S.C. § 119(a) on Patent Application No. 202110301298.X filed in P.R. China on Mar. 22, 2021, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD

The invention relates to the technical field of power electronics, and particularly to an insulation device and an electrical device having the same.

BACKGROUND

Power electronic converters have advantages of high efficiency and modularization, and are the development direction of future data center and power of charging piles. The converter system may be formed of a plurality of modules cascaded, wherein an input side of the system is a high voltage AC input (e.g., input voltages are 10 kV, 13.8 kV or 20 kV), and an output side of the system is a low voltage DC output (e.g., an output voltage is 1 kV). In the whole system, there are mainly three positions related to isolation of system voltage level. The first one is interphase insulation and intermodule insulation, and mainly implemented by insulating shells of the respective modules. The second one is isolation between a high voltage side of an auxiliary power supply circuit and Safety Extra Low Voltage (SELV) of the mains supply, and a high safety isolation level is realized by the way of connecting two-level magnetic loops in series. And the third one is insulation between high and low voltage sides of the main transformer. Because the main transformer has a high power, the design shall also achieve good heat dissipation conditions.

As for insulation between the high and low voltage sides of the main transformer, since breakdown field strength of air is low, a dimension of the transformer is generally large when using air as an insulating medium. Moreover, insulating oil is not preferred because it is flammable combustible, and easily pollute the environment after leakage. Therefore, the current main transformer uses solid as the insulating medium, thereby improving reliability while reducing volume. FIG. 1A shows a structural diagram of the current main transformer 100', and FIG. 1B shows a enlarge diagram of an insulating structure 50'. A primary side (including a primary magnetic core 10' and a primary coil 30') and a secondary side (including a secondary magnetic core 20' and a secondary coil 40') of the transformer are located on upper and lower sides of an insulating structure 50' of the transformer, respectively, in two different potentials, and isolated by the insulating structure 50' therebetween. The insulating structure 50' may be a structure of a solid insulating board coated a semiconductor layer on both sides as a shielding layer 51'. And parallel shielding layers can confine the electric field in the solid insulating board, make full use of characteristics of high breakdown field strength of the solid insulating board, realize insulation and magnetic decoupling, and release power limitation, thereby facilitating heat dissipation, and also facilitating uniformity of the electric field. However, significant electric field distortion exists at an edge of the solid insulating board of such insulating structure 50', so insulation design at the edge is important for uniformity of the electric field.

Meanwhile, as for the medium voltage drive circuit, although the dimension is small, an isolation voltage is continuously increased with improvement of a voltage level of the power element. For example, a dimension of the isolation transformer for driving a high voltage element is only several millimeters, and an insulation voltage is up to 20 kV. Magnetic cores of such isolation transformer are in an upper and lower positional relation, the coils are surrounded by the magnetic cores, and two opposite planes of the magnetic cores are parallel to each other. Electric field in a middle portion of parallel planes of the magnetic cores is uniform, but an edge of the magnetic cores also faces the problem of electric field distortion, which reduces service life of insulation. Therefore, reasonable design of the insulation structure is of great importance to uniformity of the electric field at the edge and reduction of a dimension of the overall volume of the transformer.

Therefore, in the tendency of continuous improvement of application levels of the voltage, in order to effectively isolate high and low voltage components, an insulation structure having high reliability shall be designed, so that the electric field in the insulation structure shall be uniformized as could as possible. Meanwhile, in order to improve a power density, a geometric dimension of the insulation structure shall be minimized, which also requires reasonable design of insulation, in particular, design of the edge.

SUMMARY

An object of the invention is to provide an insulation device and an electrical device having the same, which can effectively solve at least one or more deficiencies in the prior art through reasonable design of an edge.

To achieve the object, according to one embodiment of the invention, the invention provides an insulation device. The insulation device includes an insulating part, and at least one conductive part located on at least one surface of the insulating part. The at least one surface of the insulating part facing the at least one conductive part has a central concave shape; and a longitudinal section of the at least one conductive part includes a straight portion in a middle portion and two curved portions extending outwardly from both ends of the straight portion. The curved portions satisfy the following equation:

$$\begin{cases} x = A\left(\phi + \frac{1}{2}\left(e^{(\phi+i\varphi)} + e^{(\phi-i\varphi)}\right)\right) \\ y = A\left(\varphi + \frac{1}{2i}\left(e^{(\phi+i\varphi)} - e^{(\phi-i\varphi)}\right)\right) \end{cases},$$

where, $A = \frac{d}{\pi}$, d is an insulation thickness of the straight portion of the insulating part along the longitudinal section, i is an imaginary unit, a value range of Ø is $(-\infty, +\infty)$, and a value range of φ is $(0.5\pi, 0.56\pi]$.

In one embodiment of the invention, the at least one conductive part includes a first conductive part and a second conductive part opposite to each other, the insulating part is disposed between the first conductive part and the second conductive part, and a first surface of the insulating part facing the first conductive part and a second surface of the insulating part facing the second conductive part have central concave shape.

In one embodiment of the invention, each of the curved portions is formed of at least two arc lines connected in turn, and a vertex of each of the arc lines falls into a range of curve defined by the equation.

In one embodiment of the invention, an outer end of each of the curved portions further forms an endpoint arc, an angle of the endpoint arc is no less than 180°, and a vertex of the endpoint arc is located on an outer side of curve defined by the equation.

In one embodiment of the invention, the curved portions corresponding to the at least one conductive part allow an electric field distortion rate at a region where both ends of the at least one conductive part are located to be less than a predetermined value.

In one embodiment of the invention, the insulating part is made of a solid insulating material, and the at least one conductive part is made of a conductive or semi-conductive material.

In one embodiment of the invention, the insulation device further includes an outer profile having a section that is a circle or a square, and the outer profile surrounds the at least one conductive part and the insulating part; or the outer profile completely covers the at least one conductive part and the insulating part.

According to another embodiment of the invention, the invention further provides an insulation device. The insulation device includes an insulating part, and at least one conductive part located on at least one surface of the insulating part. The at least one surface of the insulating part facing the at least one conductive part has a central concave shape, the at least one surface includes a middle portion and an edge, the middle portion extends along an axis direction to form the edge; a longitudinal section of the at least one conductive part includes a straight portion and two curved portions extending outwardly from both ends of the straight portion, a longitudinal section of the middle portion corresponds to the straight portion, and a longitudinal section of the edge corresponds to the curved portions.

In another embodiment of the invention, the curved portions satisfy the following equation:

$$\begin{cases} x = A\left(\phi + \frac{1}{2}\left(e^{(\phi+i\varphi)} + e^{(\phi-i\varphi)}\right)\right) \\ y = A\left(\varphi + \frac{1}{2i}\left(e^{(\phi+i\varphi)} - e^{(\phi-i\varphi)}\right)\right) \end{cases},$$

$$\text{where, } A = \frac{d}{\pi},$$

d is an insulation thickness of the straight portion of the insulating part along the longitudinal section, i is an imaginary unit, a value range of Ø is $(-\infty, +\infty)$, and a value range of φ is $(0.5\pi, 0.56\pi]$.

In another embodiment of the invention, the at least one conductive part includes a first conductive part and a second conductive part opposite to each other, the insulating part is disposed between the first conductive part and the second conductive part, and a first surface of the insulating part facing the first conductive part and a second surface of the insulating part facing the second conductive part have central concave shape.

In another embodiment of the invention, each of the curved portions is formed of at least two arc lines connected in turn, and a vertex of each of the arc lines falls into a range of curve defined by the equation.

In another embodiment of the invention, an outer end of each of the curved portions further forms an endpoint arc, an angle of the endpoint arc is no less than 180°, and a vertex of the endpoint arc is located on an outer side of curve defined by the equation.

In another embodiment of the invention, the curved portions corresponding to the at least one conductive part allow an electric field distortion rate at a region where both ends of the at least one conductive part are located to be less than a predetermined value.

In another embodiment of the invention, the insulating part is made of a solid insulating material, and the at least one conductive part is made of a conductive or semi-conductive material.

In another embodiment of the invention, the first surface includes a first middle portion extending along a first axis direction to form a first edge, a longitudinal section of the first middle portion corresponds to the straight portion of the first conductive part, and a longitudinal section of the first edge corresponds to the curved portions of the first conductive part; the second surface includes a second middle portion extending along a second axis direction to form a second edge, a longitudinal section of the second middle portion corresponds to the straight portion of the second conductive part, and a longitudinal section of the second edge corresponds to the curved portions of the second conductive part; wherein the first axis direction is opposite to the second axis direction.

In another embodiment of the invention, the insulation device further includes an outer profile having a section that is a circle or a square, and the outer profile surrounds the at least one conductive part and the insulating part; or the outer profile completely covers the at least one conductive part and the insulating part.

According to yet another embodiment of the invention, the invention further provides an electrical device. The electrical device includes the insulation device according to one embodiment described above, and at least one electrical structure disposed corresponding to at least one conductive part of the insulation device.

In yet another embodiment of the invention, the at least one conductive part of the insulation device includes a first conductive part and a second conductive part, and the at least one electrical structure includes a high voltage structure disposed corresponding to the first conductive part, and a low voltage structure disposed corresponding to the second conductive part.

In yet another embodiment of the invention, a potential difference between the high voltage structure and the low voltage structure is greater than 1 kV, and forms an electric field in which the insulation device is disposed.

In yet another embodiment of the invention, the electrical device is a transformer. The transformer includes a first magnetic core, a second magnetic core, a first winding and a second winding, the first winding is surrounded by the first magnetic core and disposed corresponding to the first conductive part, and the second winding is surrounded by the second magnetic core and disposed corresponding to the second conductive part; wherein a top surface of the first magnetic core and a top surface of the second magnetic core are parallel and opposing each other, the first conductive part covers the top surface of the first magnetic core, and the second conductive part covers the top surface of the second magnetic core.

According to yet another embodiment of the invention, the invention further provides an electrical device. The electrical device includes the insulation device according to another embodiment described above, and at least one electrical structure disposed corresponding to at least one conductive part of the insulation device.

In yet another embodiment of the invention, the at least one conductive part of the insulation device includes a first conductive part and a second conductive part, and the at least one electrical structure includes a high voltage structure disposed corresponding to the first conductive part, and a low voltage structure disposed corresponding to the second conductive part.

In yet another embodiment of the invention, a potential difference between the high voltage structure and the low voltage structure is greater than 1 kV, and forms an electric field in which the insulation device is disposed.

In yet another embodiment of the invention, the electrical device is a transformer. The transformer includes a first magnetic core, a second magnetic core, a first winding and a second winding, the first winding is surrounded by the first magnetic core and disposed corresponding to the first conductive part, and the second winding is surrounded by the second magnetic core and disposed corresponding to the second conductive part; wherein a top surface of the first magnetic core and a top surface of the second magnetic core are parallel and opposing each other, the first conductive part covers the top surface of the first magnetic core, and the second conductive part covers the top surface of the second magnetic core.

The additional aspects and advantages of the invention are partially explained in the below description, and partially becoming apparent from the description, or can be obtained through the practice of the invention.

BRIEF DESCRIPTION OF THE DRAWINGS

The exemplary embodiments are described in details with reference to the accompanying drawings, through which the above and other features and advantages of the invention will become more apparent.

DETAILED DESCRIPTION

Figure 1A:
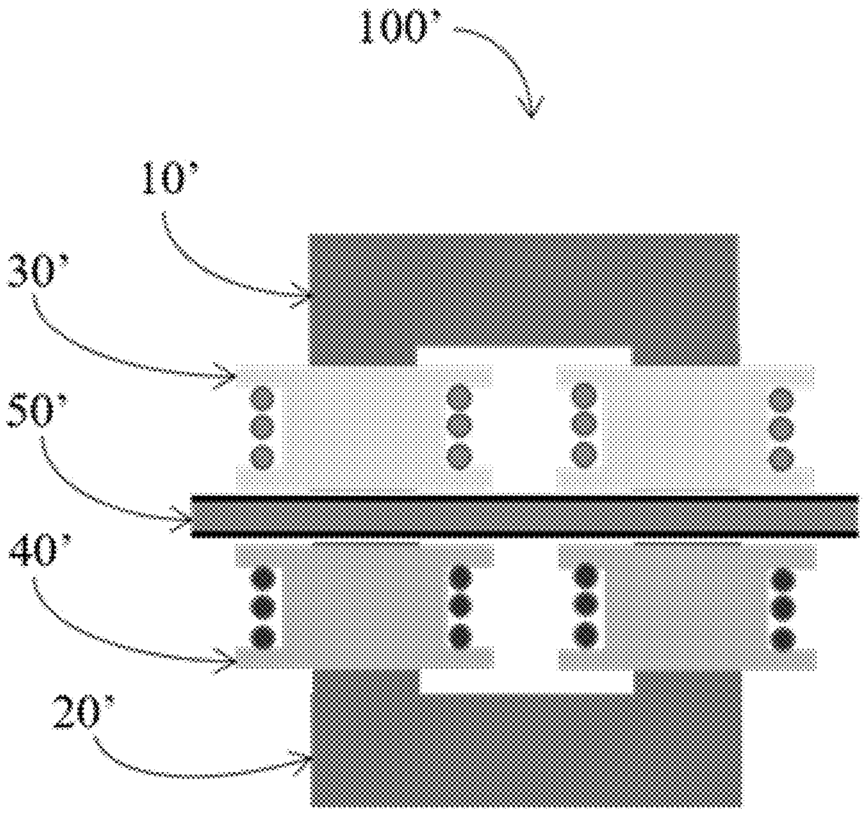
FIG. 1A is a structural diagram of the current main transformer.

The exemplary embodiments will now be described more fully with reference to the accompanying drawings. However, the exemplary embodiments can be implemented in various forms and shall not be understood as being limited to the embodiments set forth herein; on the contrary, these embodiments are provided so that this invention will be thorough and complete, and the conception of exemplary embodiments will be fully conveyed to those skilled in the art. In the drawings, the same reference sign denotes the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning, and refer to additional factors/components/the like, in addition to the listed factors/components/the like. The embodiments may use relative phrases, such as, "upper" or "lower" to describe a relative relation of one signed component over another component. It shall be understood that if the signed device reverses to turn upside down, the described component on an "upper" side will become a component on a "lower" side. In addition, the terms "first", "second" and the like in the claims are only used as signs, instead of numeral limitations to objects.

Figure 2A:
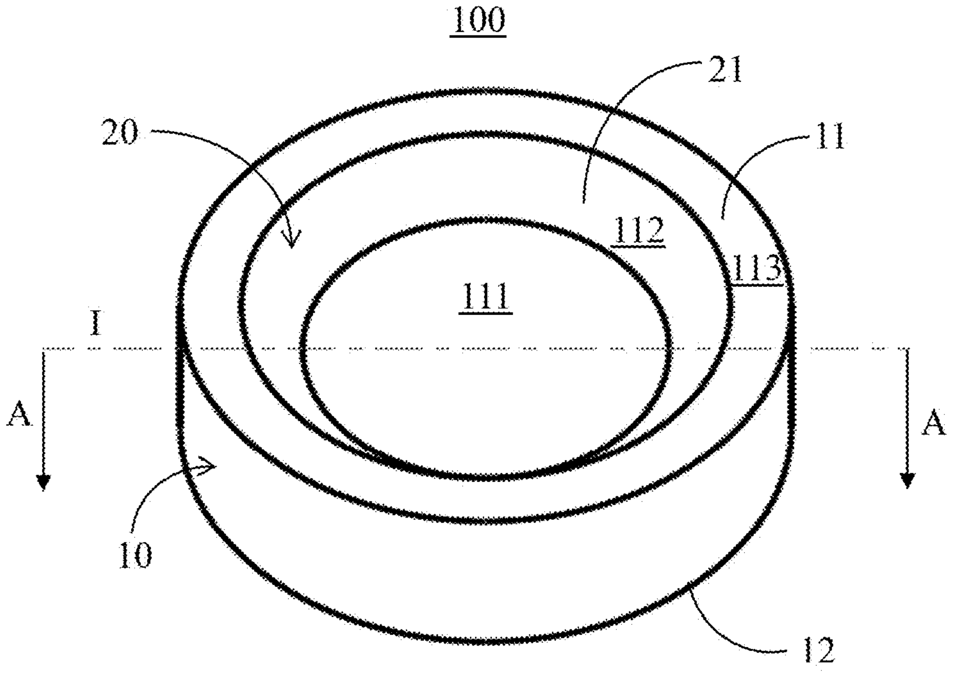
FIG. 2A is a schematic diagram of a spatial structure of an insulation device according to one preferable embodiment of the invention.
Figure 2B:
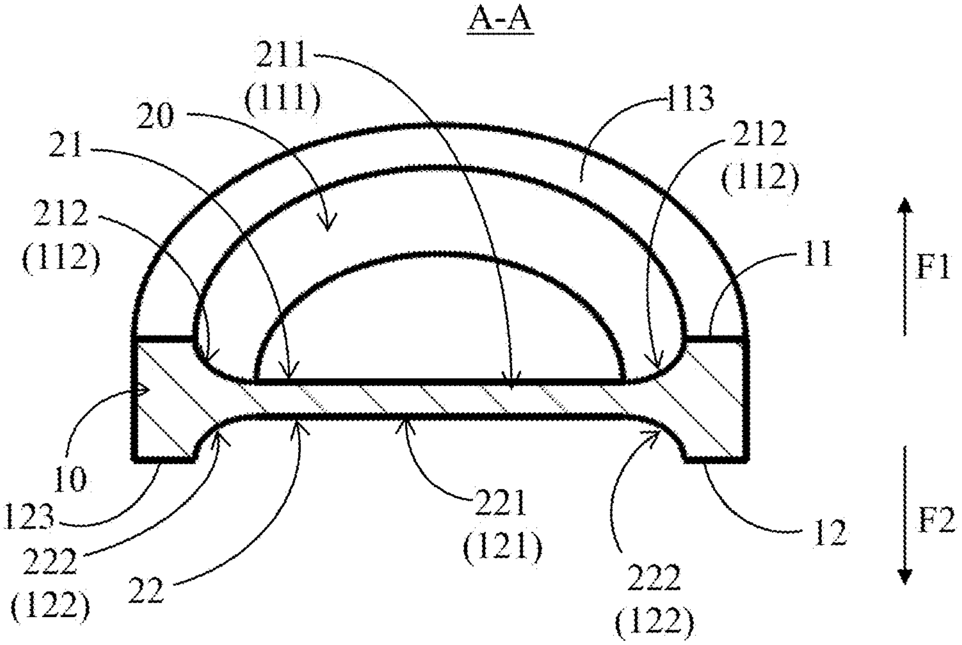
FIG. 2B is a sectional diagram along a direction of A-A in FIG. 2A.

To solve the problem of electric field distortion at the edge, as shown in FIGS. 2A and 2B, the invention provides an insulation device 100. The insulation device 100 includes an insulating part 10 and at least one conductive part 20, and the at least one conductive part 20 is correspondingly located on at least one surface of the insulating part 10. For example, the insulating part 10 may comprise a first surface 11 and a second surface 12 opposite to each other, the at least one conductive part 20 may comprise a first conductive part 21 and a second conductive part 22 opposite to each other, and the insulating part 10 is disposed between the first conductive part 21 and the second conductive part 22.

The at least one surface of the insulating part 10 facing the at least one conductive part 20 may have a central concave shape, the at least one surface comprises a middle portion and an edge, and the middle portion extends along an axis direction to form the edge. A longitudinal section of the at least one conductive part 20 includes a straight portion and two curved portions extending outwardly from both ends of the straight portion. Moreover, a longitudinal section of the middle portion of the at least one surface of the insulating part 10 corresponds to the straight portion of the at least one conductive part 20, and a longitudinal section of the edge of the at least one surface of the insulating part 10 corresponds to the curved portions of the at least one conductive part 20. The curved portions corresponding to the at least one conductive part in the invention may allow an electric field distortion rate at a region where both ends of the at least one conductive part are located to be less than a predetermined value. In the invention, the insulating part 10 may be made of a solid insulating material, and the at least one conductive part 20 may be made of a conductive or semi-conductive material.

In the embodiment shown in FIGS. 2A and 2B, the first surface 11 and the second surface 12 of the insulating part 10 have central concave shape, such as, bowl shape. The first surface 11 comprises a first middle portion 111 extending along a first axis direction F1 (e.g., upwardly) to form a first edge 112, a longitudinal section of the first middle portion 111 corresponds to the straight portion 211 of the first conductive part 21, and a longitudinal section of the first edge 112 corresponds to the curved portions 212 of the first conductive part 21. The second surface 12 comprises a second middle portion 121 extending along a second axis direction F2 (e.g., downwardly) to form a second edge 122, a longitudinal section of the second middle portion 121 corresponds to the straight portion 221 of the second conductive part 22, and a longitudinal section of the second edge 122 corresponds to the curved portions 222 of the second conductive part 22. The first axis direction F1 is opposite to the second axis direction F2.

In the embodiment shown in FIGS. 2A and 2B, the first surface 11 may further comprise an outer profile portion 113 formed by extending outwardly from an outer end of the first edge 112, the outer profile portion 113 is parallel to the straight portion 111; the second surface 12 may further comprise an outer profile portion 123 formed by extending outwardly from an outer end of the second edge 122, and the outer profile portion 123 is parallel to the straight portion 121. The outer profile portions 113 and 123 form an outer profile of the insulation device 100, and a traverse section of the outer profile, for example, may be a circle. Moreover, the outer profile surrounds the conductive part 20 and the insulating part 10. Of course, it can be understood that according to needs of different designs, the traverse section of the outer profile of the insulation device 100 also can be designed to other shapes, such as, a square (shown in FIGS. 13A and 13B).

Figure 3A:
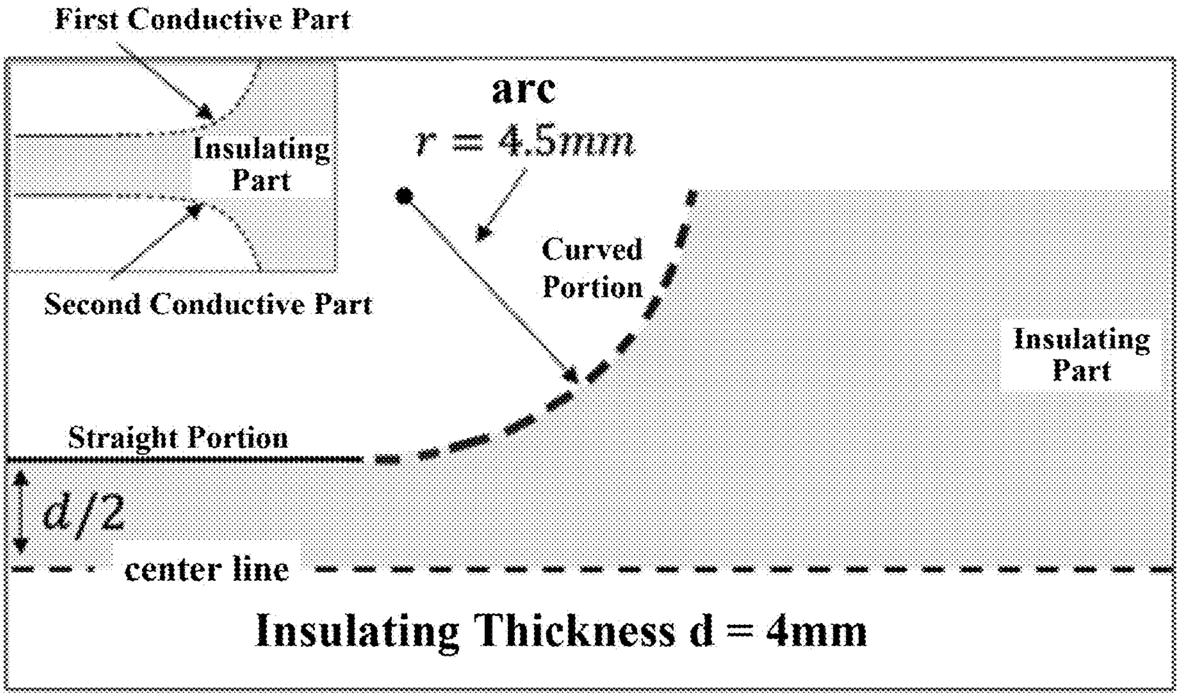
FIG. 3A is a schematic diagram of an insulation device according to a first preferable embodiment of the invention, of which the section of the conductive part is a structure of "straight portion+chamfering portion at edge".
Figure 3B:
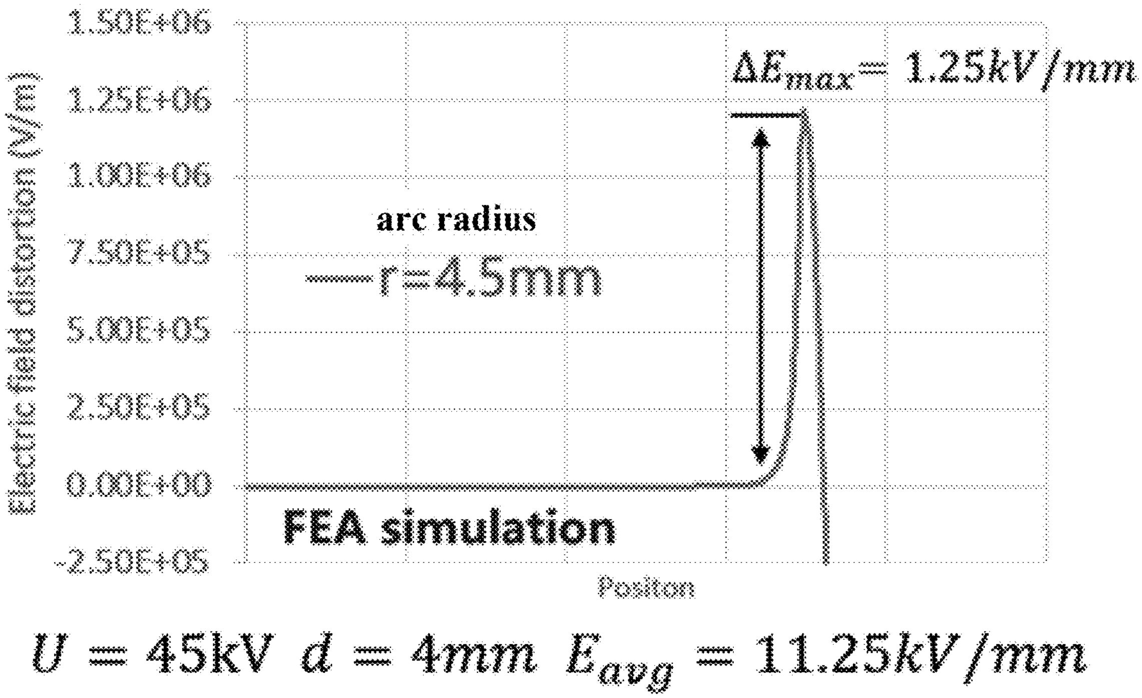
FIG. 3B is a schematic diagram of electric field distortion of the section shown in FIG. 3A.

In a first embodiment of the invention, a sectional structure of the conductive part of the insulation device has a straight portion and edges designed as chamfering arc, thereby realizing uniformity of the electric field. And a structural diagram of a part of longitudinal section is shown in FIG. 3A. The insulation device is formed by a first conductive part, a second conductive part, and an insulating part between the first conductive part and the second conductive part. A section curve of a longitudinal section of each of the first conductive part and the second conductive part includes a straight portion in the middle and a curved portion at the edge, and the curved portion is an arc with chamfering fillet, thereby realizing uniformity of the electric field at the edge. The first conductive part and the second conductive part are tightly bonded with the insulating part therebetween, and there is no air gap at the interface. The insulation device in such solution is simple in processing, but electric field distortion at the edge is still quite serious. For example, as for the insulation device in FIG. 3A, an insulation thickness d is equal to 4 mm, a radius r of the chamfering fillet at edge is equal to 4.5 mm at the edge. When a voltage U is equal to 45 kV, an average electric field $E_{avg}$ is equal to 45 kV/4 mm, that is 11.25 kV/mm, and electric field distortion $\Delta E = E - E_{avg}$ along the section curve is shown by a curve in FIG. 3B. As can be seen from FIG. 3B, the maximum electric field distortion $\Delta E_{max}$ is higher to 1.25 kV/mm, and an increased ratio is $\Delta E_{max}/E_{avg}=11\%$.

Figure 4A:
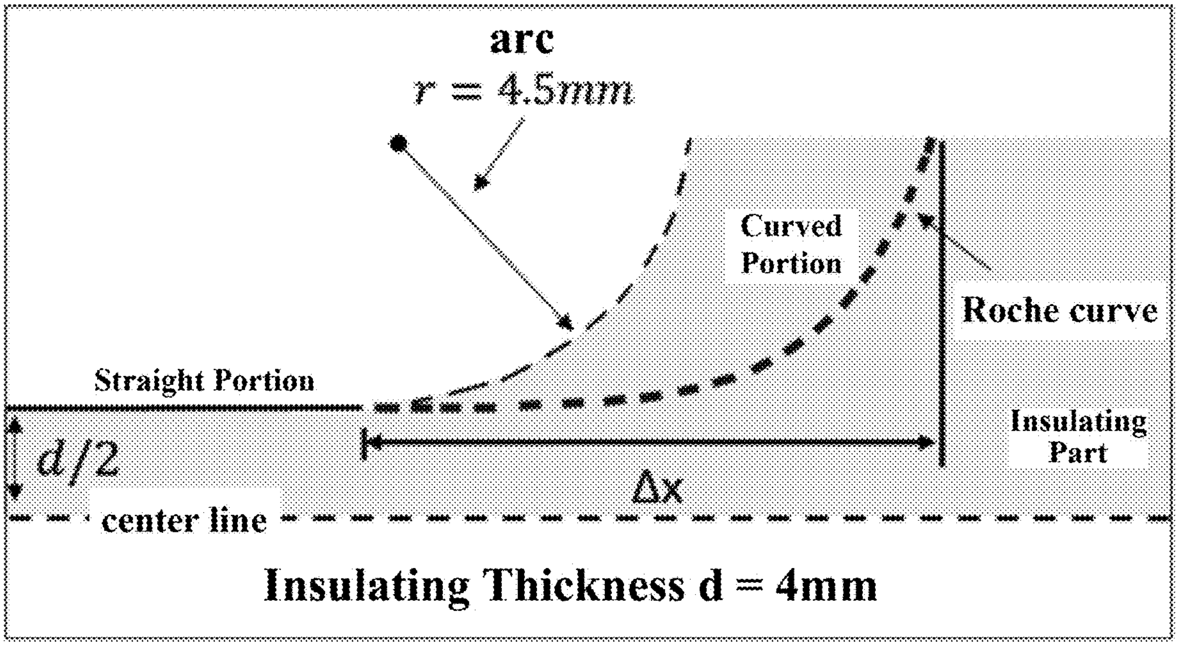
FIG. 4A is a schematic diagram of an insulation device according to a second preferable embodiment of the invention, of which the section of the conductive part is a structure of "straight portion+Roche curved portion at edge".
Figure 4B:
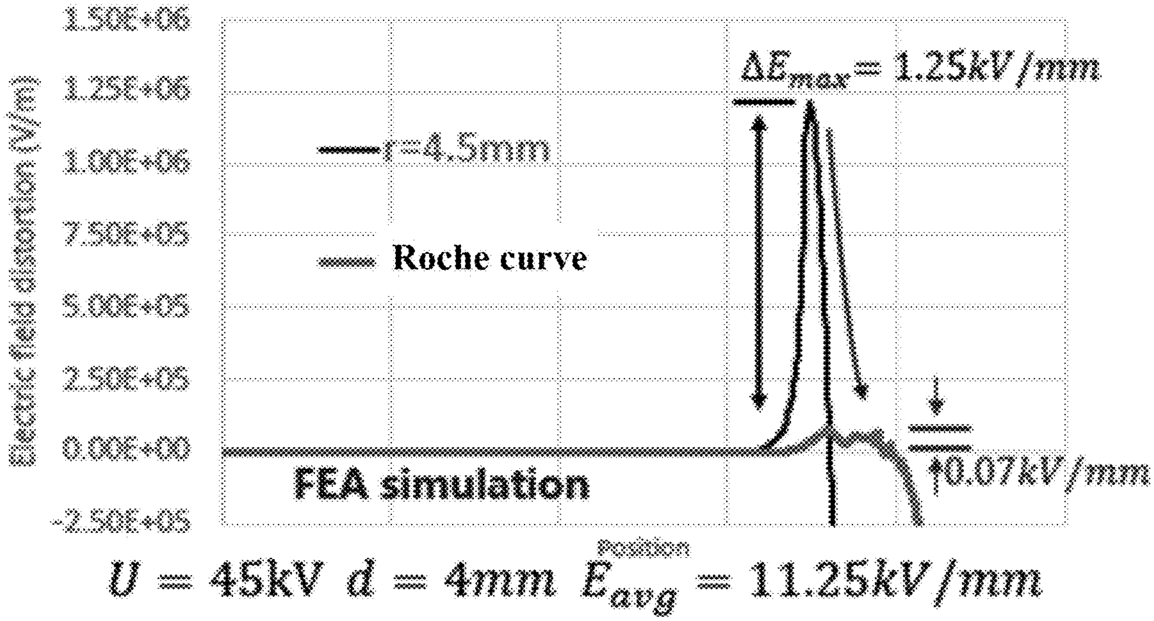
FIG. 4B is a schematic diagram of electric field distortion of the section shown in FIG. 4A.

In a second embodiment of the invention, a sectional structure of the conductive part of the insulation device has a straight portion and edges designed as a Roche curve, thereby realizing uniformity of the electric field. A structural diagram of a part of longitudinal section is shown in FIG. 4A. The insulation device is formed by a first conductive part, a second conductive part, and an insulating part between the first conductive part and the second conductive part. A section curve of a longitudinal section of each of the first conductive part and the second conductive part includes a straight portion in the middle and a Roche curved portion at the edge, thereby realizing uniformity of the electric field at the edge, wherein the Roche curve may be defined by an equation $$y = a\left(e^{\frac{x-b}{a}} + \frac{\pi}{2}\right),$$

and a and b are positive real numbers. The first conductive part and the second conductive part are tightly bonded with the insulating part therebetween, and there is no air gap at the interface. As compared to the first embodiment, under conditions of the same insulation structure (an insulation thickness d is equal to 4 mm, a radius r of the chamfering fillet at edge is equal to 4.5 mm and voltage U is equal to 45 kV), the maximum electric field distortion $\Delta E=E-E_{avg}$ is reduced from 1.25 kV/mm to 0.07 kV/mm Such solution has a quite significant effect of uniformity of the electric field at the edge, but relative to the solution of the first embodiment, it still has the following deficiencies. The Roche curve is fixed, although the effect of uniformity of the electric field is obvious, the edge width Δx (i.e., a width between an endpoint of the straight portion of the insulating part and an outer endpoint of the curved portion at the edge) is increased relatively. For example, in the insulation structure, the edge width Δx is increased to 1.7 times that in the case of arc, causing obvious increase in a volume of the insulation structure. Shape of the Roche curve has a relatively high requirement for manufacturing process. When shape of the self-custom curve is processed using digit control technique, the self-custom curve shall be divided into n segments, and each segment is processed as a straight segment. Accordingly, the number of segments shall be as more as enough, and thus processing complexity is increased, and meanwhile, it is difficult to control accuracy of the processed curve.

Figure 5A:
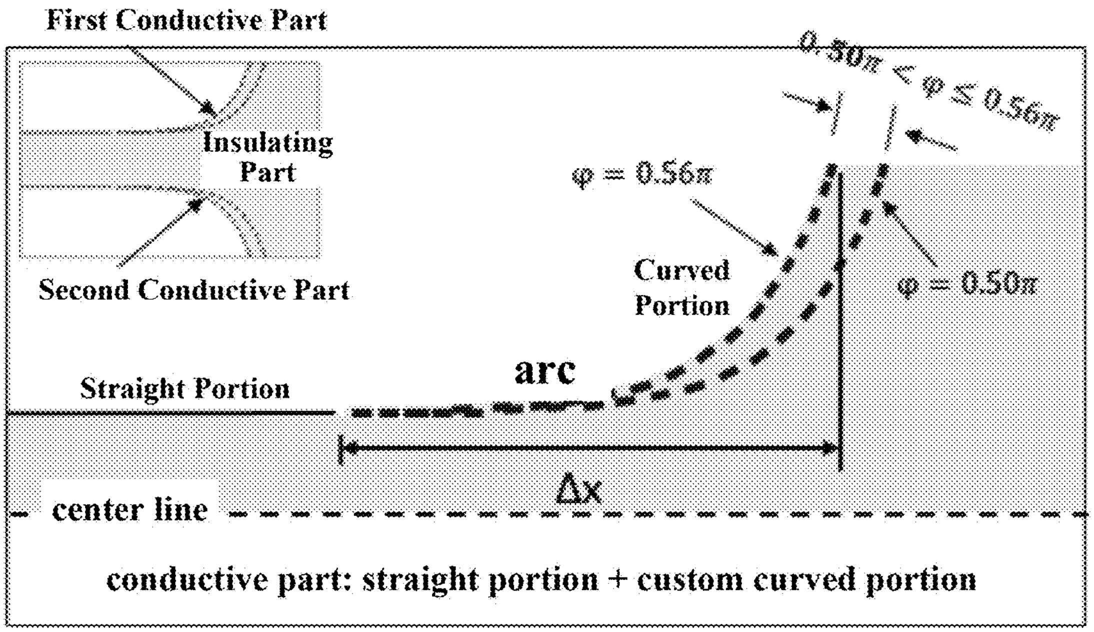
FIG. 5A is a schematic diagram of an insulation device according to a third preferable embodiment of the invention, of which the section of the conductive part is a structure of "straight portion+custom curved portion".

To achieve the objects of uniformizing the electric field and reducing a volume occupied by the edge, a third embodiment of the invention provides an insulation device. A sectional structure of the conductive part of the insulation device has a straight portion and edges designed as a custom curve, thereby realizing uniformity of the electric field. And a structural diagram of a part of longitudinal section is shown in FIG. 5A. The insulation device is formed by a first conductive part, a second conductive part, and an insulating part between the first conductive part and the second conductive part. A section curve of a longitudinal section of each of the first conductive part and the second conductive part includes a straight portion in the middle and two curved portions extending outwardly from two end of the straight portion. The curved portions satisfy the following equation:

$$\begin{cases} x = A\left(\phi + \frac{1}{2}\left(e^{(\phi+i\varphi)} + e^{(\phi-i\varphi)}\right)\right) \\ y = A\left(\varphi + \frac{1}{2i}\left(e^{(\phi+i\varphi)} - e^{(\phi-i\varphi)}\right)\right) \end{cases}$$

$$\text{where, } A = \frac{d}{\pi},$$

d is an insulation thickness of the straight portion of the insulating part along the longitudinal section, i is an imaginary unit, a value range of Ø is (−∞, +∞), and a value range of φ is (0.5π, 0.56π].

Figure 5B:
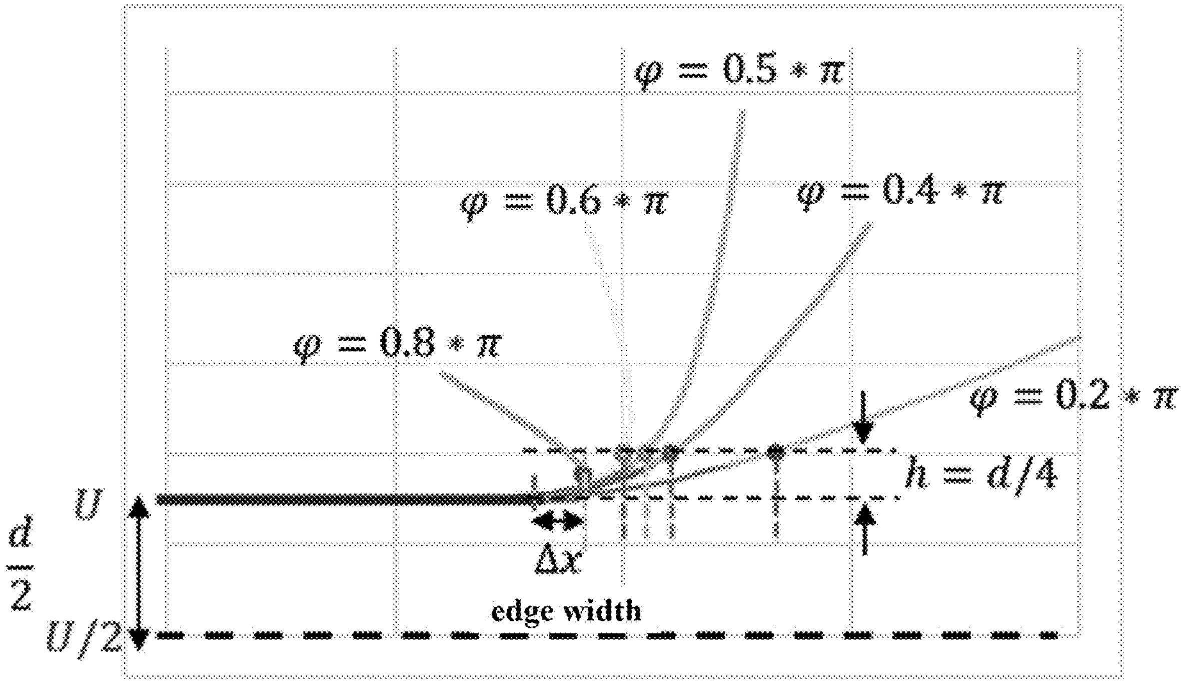
FIG. 5B is a diagram of normalized equpotential lines formed by a parallel electrode when an insulation thickness of an insulating part of the insulation device of the invention is d.

FIG. 5B shows a diagram of normalized equpotential lines formed by a parallel electrode when an insulation thickness is d, and each equpotential line can function as a section curve of a conductive part. The curve φ=0.5*π is the same as the Roche curve, so distribution of an electric field of the curve φ=0.5*π is the same as distribution of the electric field of the Roche curve. As can be seen from FIG. 5B, with increase of an angle φ, the section curve shrinks toward the left. In other words, the edge width Δx is gradually decreased. Correspondingly, with the same height h=d/4, the edge widths Δx as a function of the angle φ is shown by a curve L1 in FIG. 5C.

Figure 5C:
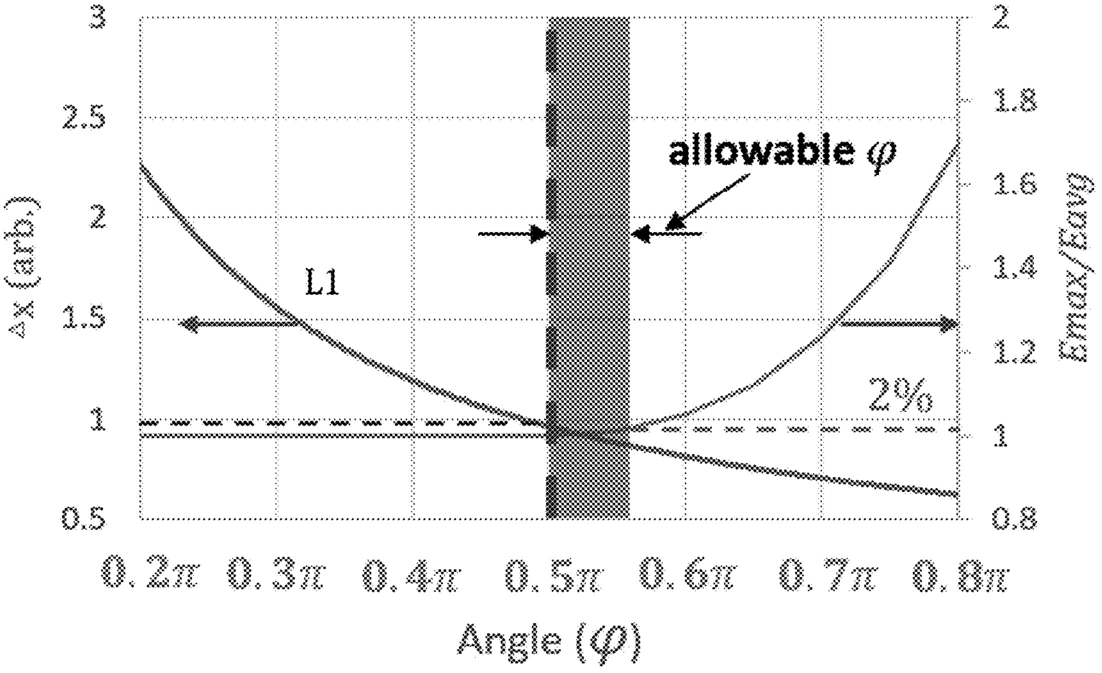
FIG. 5C is a schematic diagram of an electric field distortion rate Emax/Eavg and an edge width Δx of the insulation device of the invention as a function of an angle φ.

FIG. 5C shows an electric field distortion rate Emax/Eavg and an edge width Δx as a function of an angle φ. The maximum electric field value along a corresponding potential line of different angles φ may be expressed by formula (1):

$$Emax = \begin{cases} \frac{U}{d}\frac{2i}{e^{i\varphi} - e^{-i\varphi}} \ (\varphi \geq \pi/2) \\ \frac{U}{d} \ (\varphi < \pi/2) \end{cases} \quad (1)$$

With increase of φ, the maximum electric field Emax is gradually increased, and since E=U/d is a constant quantity, the electric field distortion rate Emax/Eavg is also gradually increased.

As shown in FIG. 5C, there are two limitations: (1) the insulated edge width Δx should be less than a width of the Roche curve, (2) according to experience in design of insulation, an increment (Emax−Eavg)/Eavg of the electric field distortion rate should be in the range [2%, 6%]. In theoretical calculation, the increment (Emax−Eavg)/Eavg of the electric field distortion rate is set as 2%, and thus a value range 0.5π<φ≤0.56π of the angle φ can be obtained. However, it can be understood that according to needs of different designs, the value range of the angle φ also can be other range, but the invention is not limited thereto.

Figure 6A:
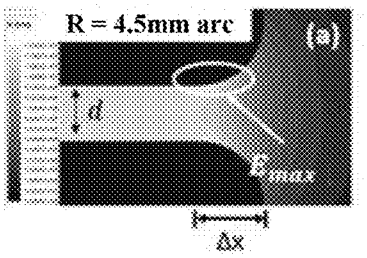
FIGS. 6A, 6B and 6C are schematic diagrams of distributions of electric fields when the edge is arc with R=4.5 mm, Roche curve, and custom curve φ=0.56π.
Figure 6B:
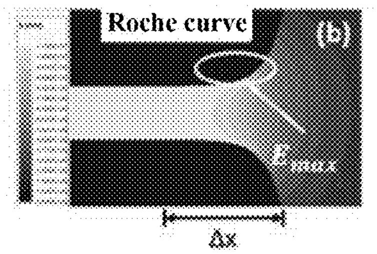
Figure 6C:
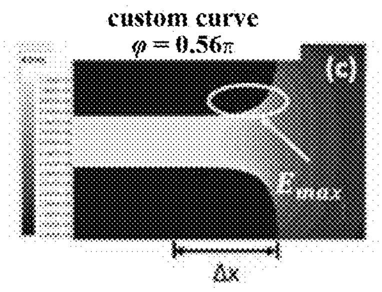
Figure 7:
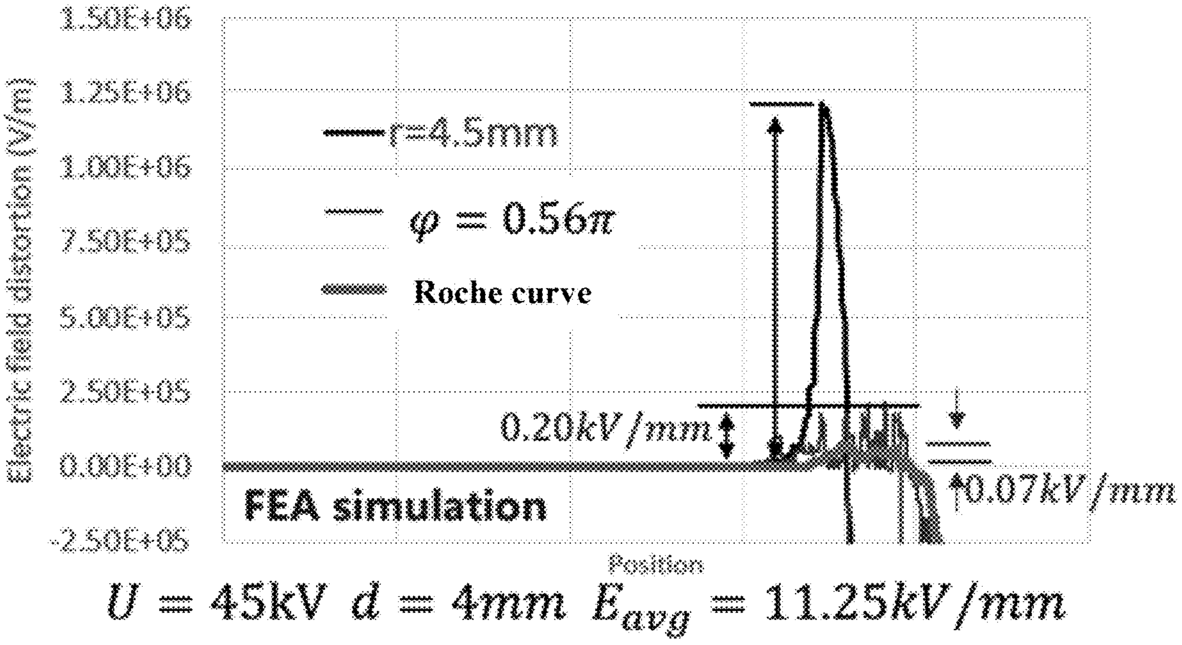
FIG. 7 is a schematic diagram of electric field distortions along three edges that are insulated section curves of arc with R=4.5 mm, Roche curve, and custom curve φ=0.56π.

FIGS. 6A-6C show diagrams of distributions of electric fields when the edge is an arc with r=4.5 mm, a Roche curve, a custom curve with a curve angle φ=0.56π, change of the electric fields along the three insulated section curves is shown in FIG. 7, and comparisons of the three edges are shown in Table 1. Distributions of the electric fields can be calculated using a finite element calculation method, and simulation parameters are: voltage U=45 kV, and insulation thickness d=4 mm. As shown, the maximum electric field is at a lower side of the edge, and Δx shows the edge width.

TABLE 1

Comparison of Edge Width and Electric Field Distortion

| Edge Solutions | Edge Width Δx | Electric Field Distortion |
|---|---|---|
| Arc with r = 4.5 mm | 4.5 mm (100%) | 1.25 kV/mm (100%) |
| Roche Curve | 7.8 mm (170%) | 0.07 kV/mm (6%) |
| Custom curve φ = 0.56π | 6.7 mm (150%) | 0.20 kV/mm (16%) |

Table 1 shows comparisons between the edge widths and the maximum electric field distortions when using the three curves, and comparisons are made based on data when the edge is an arc with r=4.5 mm. The maximum electric field distortion of the arc is 1.25 kV/mm, and it is reduced to 0.07 kV/mm when using Roche curve, and it is increased to 0.20 kV/mm when using custom curve φ=0.56π, so the maximum electric field distortion when using Roche curve is 6% of the maximum electric field distortion when using arc, and the maximum electric field distortion when using custom curve φ=0.56π is 16% of the maximum electric field distortion when using arc. When comparing the edge widths, the edge width when using Roche curve is 1.7 times of the edge width when using arc, and the edge width when using custom curve φ=0.56π is reduced to 1.5 times of the edge width when using arc. As can be seen, when custom curve φ=0.56π is compared with Roche curve, although the electric field distortion is increased, the edge width is reduced.

Figure 1B:
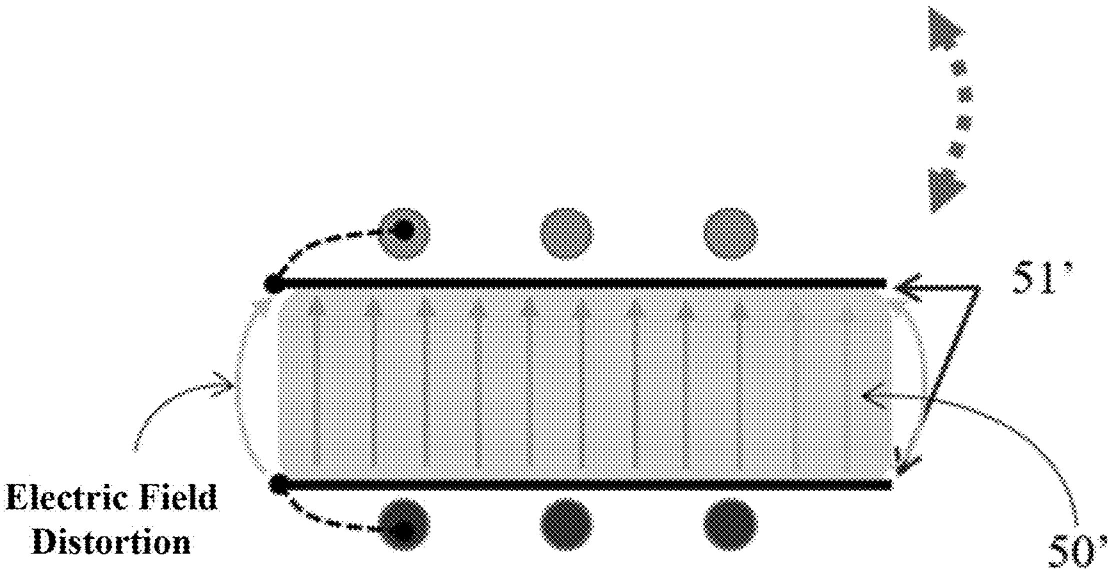
FIG. 1B shows a enlarge diagram of an insulating structure 50'.

Comparing with the insulation device having the curved portion with the Roche curve, if a sectional diameter perpendicular to a direction of the insulation thickness of the high-frequency high-voltage transformer is 90 mm (shown in FIG. 1), the dimension of the insulation device having the curved portion with custom curve is reduced by 2.4%. As for the auxiliary power transformer with a sectional diameter of 50 mm, the dimension of the insulation device having the curved portion with the custom curve is reduced by 4.4%. For applications of isolation and driving of the future high-frequency high-voltage device, since a dimension of the insulation device is reduced, the improved effect of the insulation device having the curved portion with the custom curve is more obvious. For example, if a sectional diameter of the isolation transformer is 16 mm, a reduced ratio of a dimension is up to 13.7%.

Therefore, as compare to the solution of the first embodiment, the solution of the third embodiment can reduce electric field distortion at edge, thereby improving a local discharge level of the device, and facilitating design of insulation and thinning; and as compare to the solution of the second embodiment, the solution of the third embodiment of the invention can reduce the insulated edge width, and realize uniformity of the electric field in a compact volume.

Figure 8:
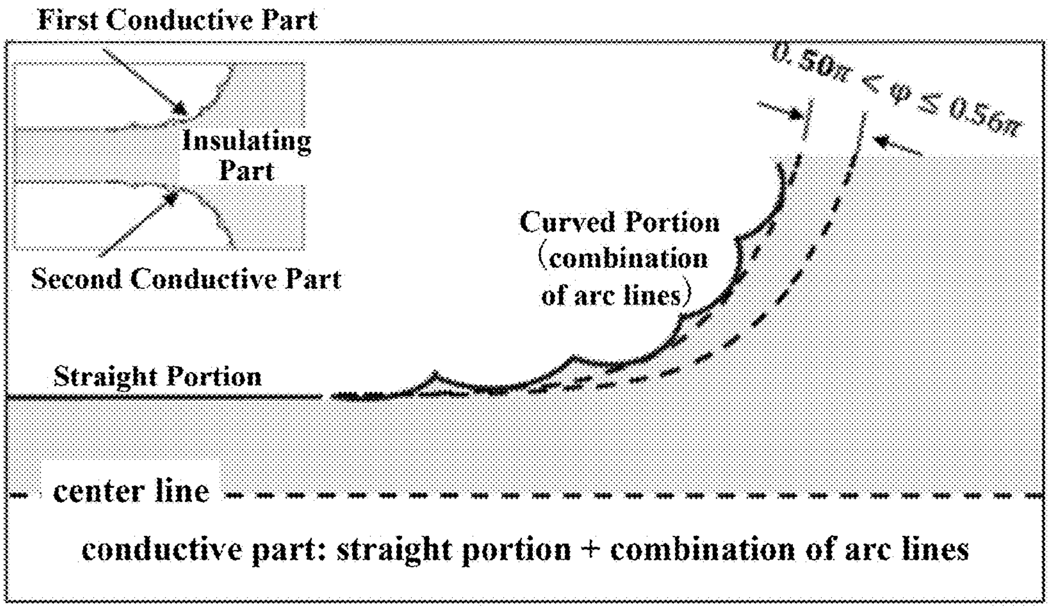
FIG. 8 is a schematic diagram of an insulation device according to a fourth preferable embodiment of the invention, of which the section of the conductive part is a structure of "straight portion+combination of arc lines".

However, when processing edge curves described by the specific equation in the third embodiment, the requirement for manufacturing process is high. To overcome the disadvantage, a fourth embodiment of the invention provides an insulation device, which can replace the curves defined by the specific equation in the third embodiment with a combination of a series of arc lines. That is, each of the curved portions may be formed of at least two arc lines connected in turn, and a vertex of each of the arc lines falls into a range of curve defined by the equation. As shown in FIG. 8, it shows an insulation device according to a fourth embodiment of the invention. A sectional structure of the conductive part of the insulation device has a straight portion and edges designed as combination of arc lines. The insulation device is formed by a first conductive part, a second conductive part, and an insulating part between the first conductive part and the second conductive part. A section curve of a longitudinal section of each of the first conductive part and the second conductive part includes a straight portion in the middle and two curved portions extending outwardly from two end portions of the straight portion, and each of the curved portions is formed of at least two arc lines connected in turn. A vertex of each arc lines in the combination of arc lines at the edge falls into a range of curve defined by the equation, and the curve satisfies the following equation:

$$\begin{cases} x = A\left(\phi + \frac{1}{2}\left(e^{(\phi+i\varphi)} + e^{(\phi-i\varphi)}\right)\right) \\ y = A\left(\varphi + \frac{1}{2i}\left(e^{(\phi+i\varphi)} - e^{(\phi-i\varphi)}\right)\right) \end{cases}$$

$$\text{where, } A = \frac{d}{\pi},$$

d is an insulation thickness of the straight portion of the insulating part along the longitudinal section, i is an imaginary unit, a value range of Ø is (−∞, +∞), and a value range of φ is (0.5π, 0.56π].

Figure 9:
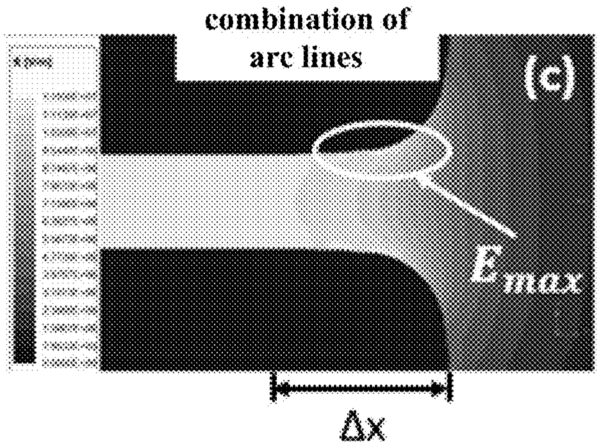
FIG. 9 is a schematic diagram of distribution of an electric field along an edge that is an insulated section curve of a combination of arc lines of custom curve φ=0.56π.

As shown in FIG. 9, it shows a diagram of distribution of an electric field when the edge is a combination of arc lines and a vertex of each arc line falls into a range of custom curve φ=0.56π. Table 2 shows the comparison of edge width and maximum electric field distortion in the three edges using combination of arc lines, arc with r=4.5 mm shown in FIG. 6A, and Roche curve shown in FIG. 6B. The combination of arc lines is formed of six arc lines connected in turn, and vertex of the six arc lines are on the custom curve φ=0.56π. Simulation parameters are: voltage U=45 kV and insulation thickness d=4 mm, which are the same as those stated previously. The maximum electric field is at a lower side of the edge, and Δx shows the edge width.

TABLE 2

Comparison of Edge Width and Electric Field Distortion

| Edge Solutions | Edge Width Δx | Electric Field Distortion |
|---|---|---|
| Arc with r = 4.5 mm | 4.5 mm (100%) | 1.25 kV/mm (100%) |
| Roche Curve | 7.8 mm (170%) | 0.07 kV/mm (6%) |
| Combination of Arc Lines (vertex of each arc line is on the custom curve φ = 0.56π) | 6.7 mm (150%) | 0.68 kV/mm (55%) |

Table 2 shows comparisons of the three edge widths and the maximum electric field distortions, and comparisons are also made based on data when the edge is an arc with r=4.5 mm. As can be seen, the electric field distortion when using the combination of arc lines is 0.68 kV/mm, as compared to the electric field distortion 1.25 kV/mm when using the arc, a reduced ratio is 55%, and it is larger than the electric field distortion (0.07 kV/mm) when using the Roche curve. However, the edge width when using the combination of arc lines is 1.5 times of the edge width when using the arc, and is less than the edge width when using the Roche curve (1.7 times).

As compare to the solution of the first embodiment, the solution of the fourth embodiment of the invention can reduce electric field distortion at edge, thereby improving a local discharge level of the device, and facilitating design of insulation and thinning. As compare to the solution of the second embodiment, the solution of the fourth embodiment of the invention can reduce the insulated edge width, and realize uniformity of the electric field in a compact volume. As compare to the solution of the third embodiment, replacing the custom curve with the combination of arc lines at edge reduces the requirement for manufacturing process.

Figure 10:
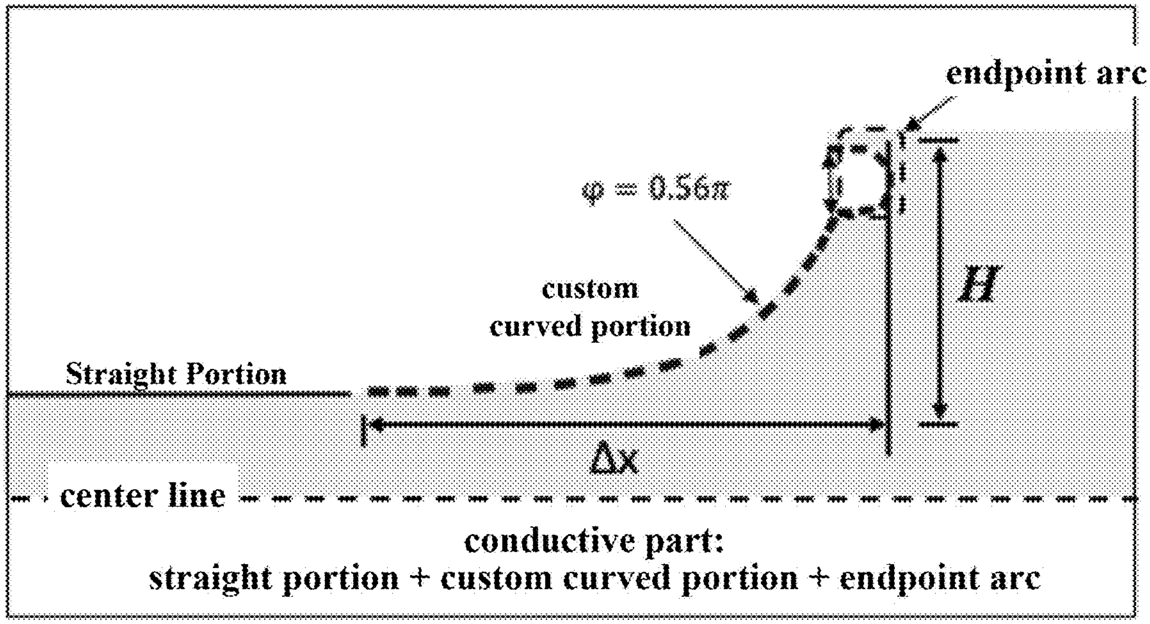
FIG. 10 is a schematic diagram of an insulation device according to a fifth preferable embodiment of the invention, of which the section of the conductive part is a structure of "straight portion+custom curved portion+endpoint arc".

A fifth embodiment of the invention further provides an insulation device. A sectional structure of the conductive part of the insulation device has a straight portion and edges designed as custom curve and endpoint arc, thereby realizing uniformity of the electric field, as shown in FIG. 10. In addition to straight portion in the middle and two curved portions extending outwardly from both end of the straight portion (the curves of the curved portions satisfy definition of the equation) included in the section of the conductive part, an outer end of each curved portion further forms an endpoint arc. Preferably, an angle of the endpoint arc is no less than 180°, and a vertex of the endpoint arc is located outside the curve defined by the equation.

Figure 11:
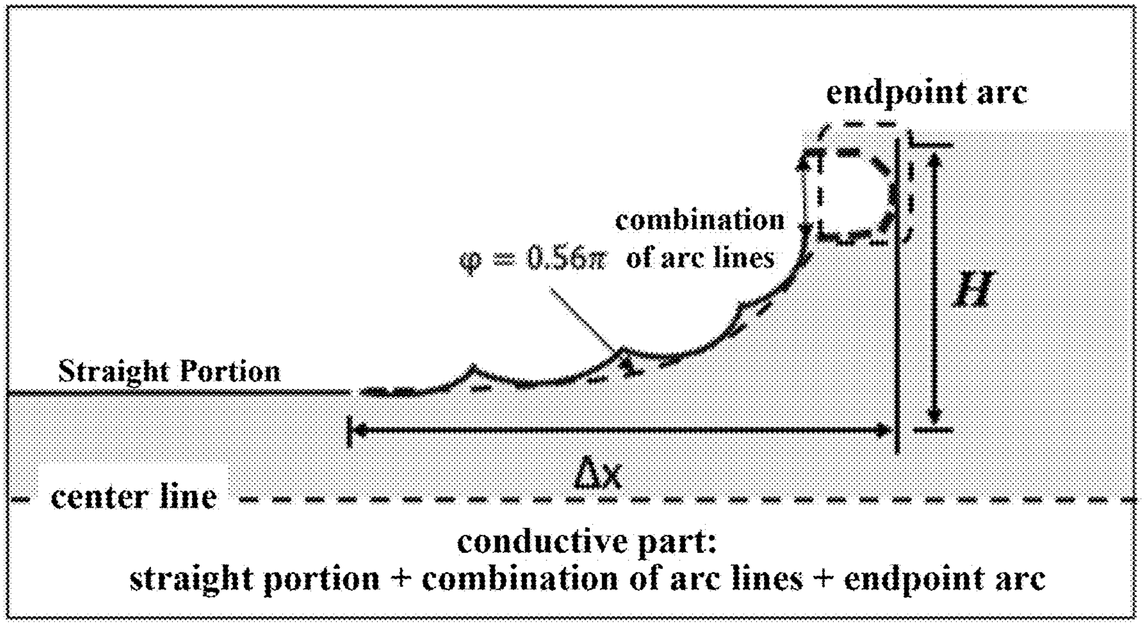
FIG. 11 is a schematic diagram of an insulation device according to a fifth preferable embodiment of the invention, of which the section of the conductive part is a structure of "straight portion+combination of arc lines+endpoint arc".

A sixth embodiment of the invention further provides an insulation device. A sectional structure of the conductive part of the insulation device has a straight portion and edges designed as combination of arc lines (four arc lines) and endpoint arc, thereby realizing uniformity of the electric field, as shown in FIG. 11. In addition to the straight portion in the middle and the combination of multiple arc lines (a vertex of each of the arc lines falls into a range of curve defined by the equation), an outer end of the combination of multiple arc lines further forms an endpoint arc. Preferably, an angle of the endpoint arc is no less than 180°, and a vertex of the endpoint arc is located outside the curve defined by the equation.

Hereinafter taking the insulation structure of the fifth embodiment for example, the advantages achieved by "an endpoint arc" are explained. Table 3 shows specific comparisons of the three edge widths and the maximum electric field distortions.

TABLE 3

Comparison of Edge Width and Maximum Electric Field Distortion

| Edge Solutions | Edge Width Δx | Maximum Electric Field Distortion ΔEmax = Emax − Eavg |
|---|---|---|
| Arc with r = 4.5 mm | 4.5 mm (100%) | 1.25 kV/mm (100%) |
| Roche Curve | 7.8 mm (170%) | 0.07 kV/mm (6%) |
| Custom curve φ = 0.56π + Endpoint Arc (diameter is insulation thickness d) | 6.8 mm (151%) | 0.20 kV/mm (16%) |

Figure 12A:
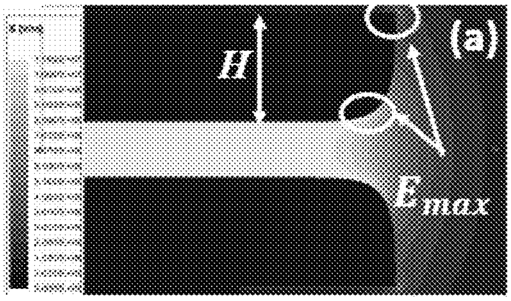
FIGS. 12A and 12B are schematic diagrams of distributions of electric fields when the edge is a Roche curve or "custom curve φ=0.56π+endpoint arc".
Figure 12B:
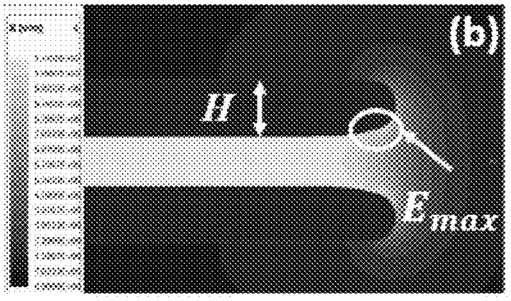

FIGS. 12A and 12B show effects of uniformity of the electric field when the edges are Roche curve and "custom curve φ=0.56π and endpoint arc (diameter is insulation thickness d)", respectively. Since local electric field enhancement is existed at vertex of the Roche curve edge, if the electric field shall be kept not to exceed the maximum electric field at the edge, the curve shall have a certain height. Under the conditions of the insulation thickness d=4 m and the impressed voltage U=45 kV, the curve shall have a height H=7.8 mm. If the insulation structure is a structure of "custom curve φ=0.56π and endpoint arc (diameter is insulation thickness d)", the height is reduced to H=4.5 mm, and the reduced ratio is 42.3%. In this embodiment, the edge width and the electric field optimization effect is equivalent to that when using custom curve φ=0.56π, and the advantages are to reduce the requirement for the insulated edge height, and facilitate ventilation and heat dissipation of the devices outside the conductive part.

Figure 13A:
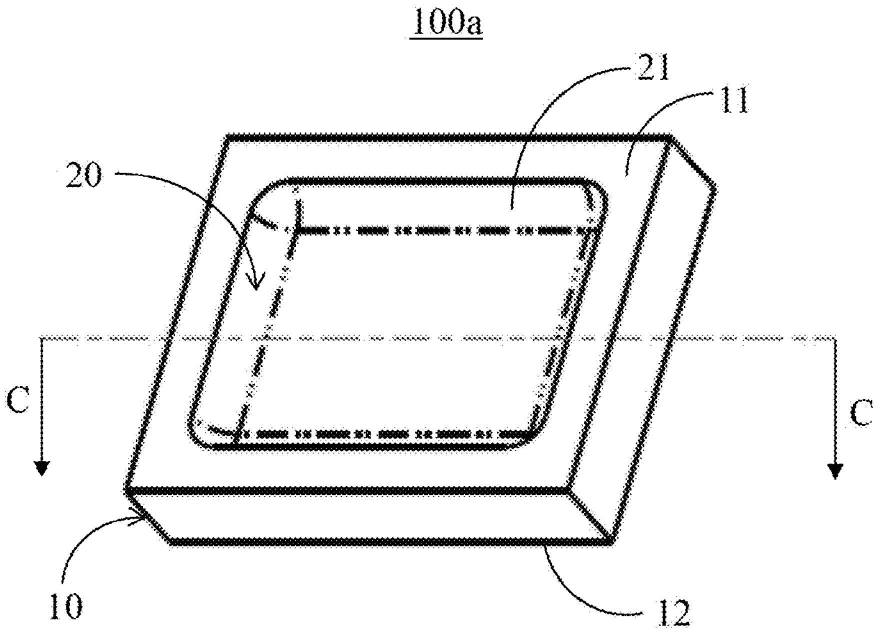
FIG. 13A is a schematic diagram of a spatial structure of an insulation device in another preferable embodiment of the invention.
Figure 13B:
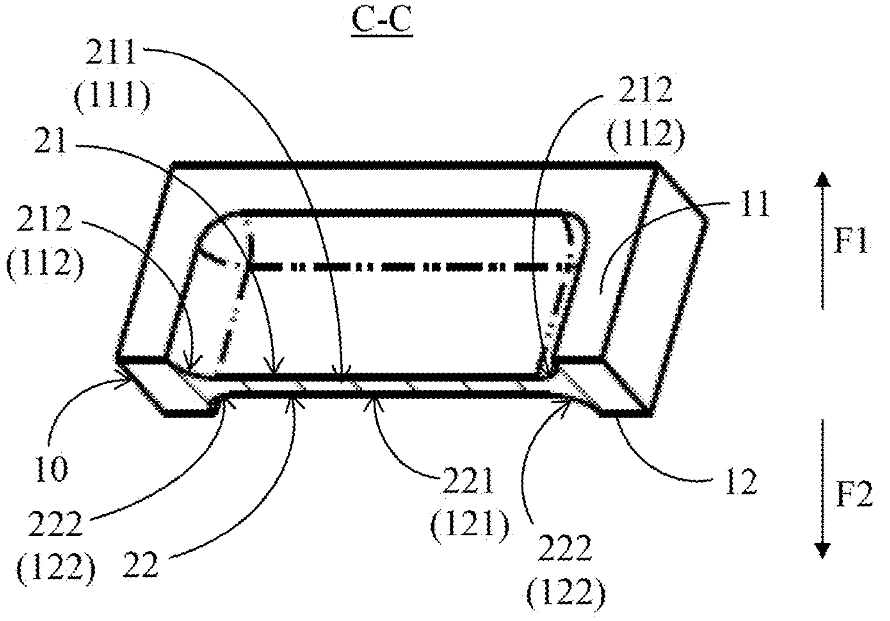
FIG. 13B is a sectional diagram along a direction of C-C in FIG. 13A.

FIGS. 13A and 13B show a spatial structure of an insulation device 100*a* in another embodiment of the invention, and differ from the embodiment shown in FIGS. 2A and 2B in that an outer profile of the insulation device 100*a* and a transverse section of the first surface 11 and the second surface 12 of the insulating part 10 facing the conductive part 20 in this embodiment are squares, while that shown in FIGS. 2A and 2B is a circle. In this embodiment, the outer profile surrounds the conductive part 20 and the insulating part 10.

The invention further provides an electrical device, including the insulation device 100 or 100*a*, and at least one electrical structure. The at least one electrical structure is disposed corresponding to the at least one conductive part 20 of the insulation device 100 or 100*a*.

The at least one conductive part of the insulation device 100 or 100*a*, for example, may include a first conductive part 21 and a second conductive part 22, and the at least one electrical structure, for example, may include a high voltage structure disposed corresponding to the first conductive part 21, and a low voltage structure disposed corresponding to the second conductive part 22. A potential difference between the high voltage structure and the low voltage structure may be greater than 1 kV, and forms an electric field in which the insulation device 100 or 100*a* is disposed.

Figure 14A:
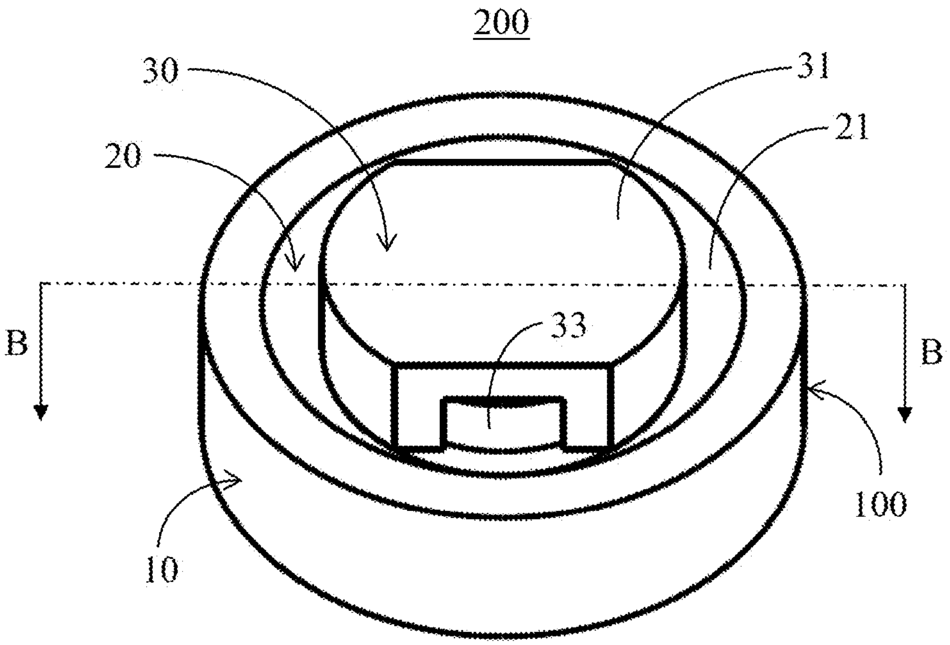
FIG. 14A is a schematic diagram of a spatial structure of an electrical device in one preferable embodiment of the invention.
Figure 14B:
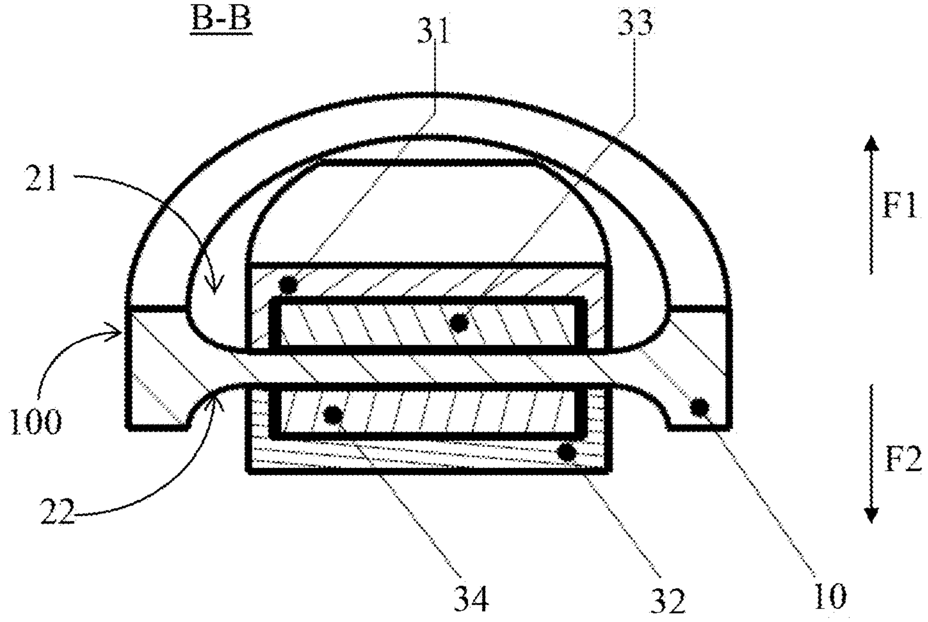
FIG. 14B is a sectional diagram along a direction of B-B in FIG. 14A.

FIGS. 14A and 14B show a spatial structure of an electrical device 200 in one embodiment of the invention. The electrical device 200, for example, may be a transformer including a first magnetic core 31, a second magnetic core 32, a first winding 33 and a second winding 34. The first winding 33 is surrounded by the first magnetic core 31, and disposed corresponding to the first conductive part 21, and the second winding 34 is surrounded by the second magnetic core 32, and disposed corresponding to the second conductive part 22. Preferably, a top surface of the first magnetic core 31 and a top surface of the second magnetic core 32 are parallel and opposing each other, a longitudinal section of the first conductive part 21 covers the top surface of the first magnetic core 31, and a longitudinal section of the second conductive part 22 covers the top surface of the second magnetic core 32.

Figure 15:
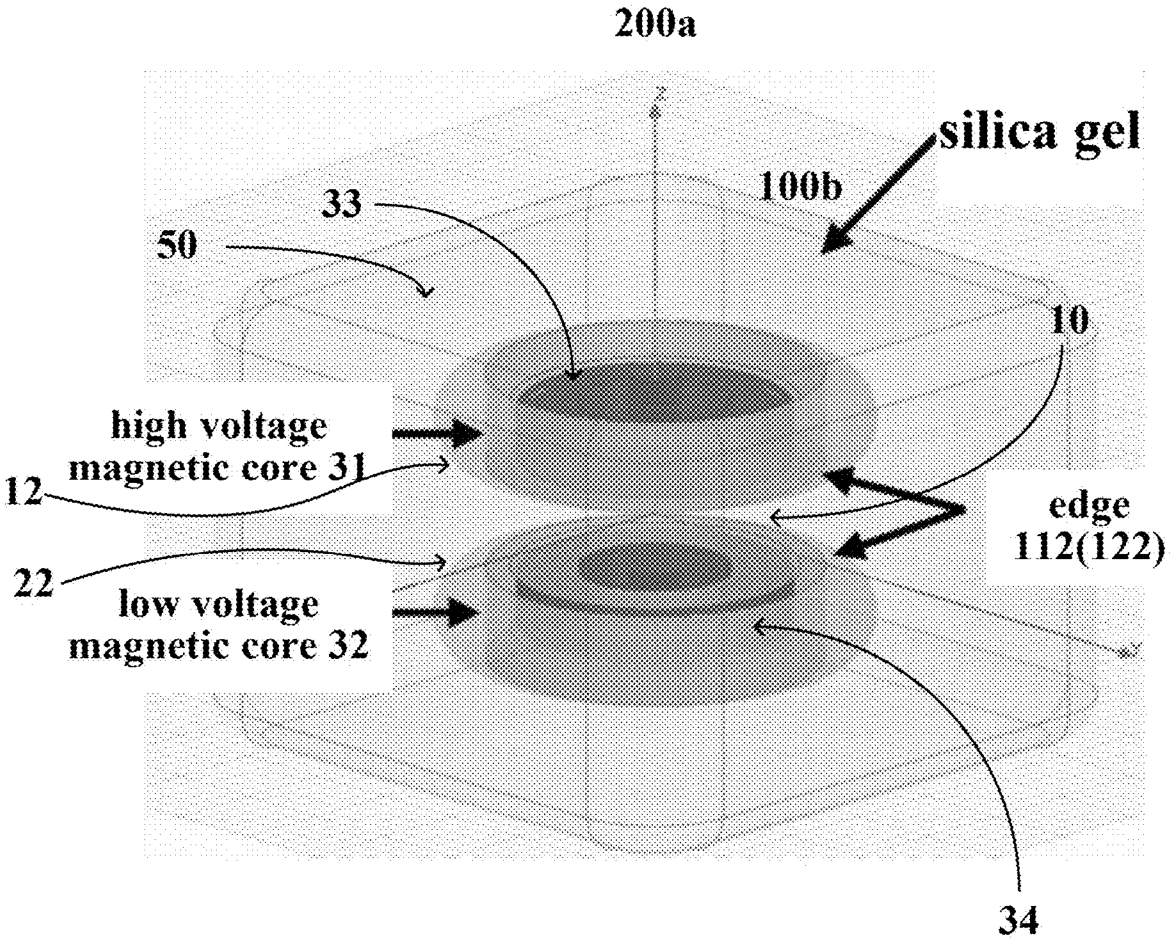
FIG. 15 is a schematic diagram of a spatial structure of an electrical device in another preferable embodiment of the invention.

As shown in FIG. 15, it shows a spatial structure of an electrical device 200*a* in another embodiment of the invention. In this embodiment, the electrical device 200*a* includes an insulation device 100*b*, the insulating part 10 of the insulation device 100*b* has edges 112 and 122, and structure of these edges 112 and 122, for example, may be the same as that of the edges 112 and 122 of the insulation devices 100 and 100*a*, so the details are not described here. The conductive part 20 of the insulation device 100*b* comprises a first conductive part 21 and a second conductive part 22. The electrical device 200*a*, for example, may be a transformer including a first magnetic core (e.g., a high voltage magnetic core) 31, a second magnetic core (e.g., a low voltage magnetic core) 32, a first winding 33 and a second winding 34. In particular, in this embodiment, the first conductive part 21 is a conductive or semi-conductive material correspondingly coated on a lower top surface of the high voltage magnetic core, the second conductive part 22 is a conductive or semi-conductive material correspondingly coated on an upper top surface of the low voltage magnetic core, and the structure of these conductive parts, for example, may be the same as the conductive parts of the insulation devices 100 and 100*a*. Correspondingly, the edges of the lower top surface of the high voltage magnetic core and the edges of the upper top surface of the low voltage magnetic core shall satisfy design of the edges. The insulating part 10 of the insulation device 100*b* is made of silica gel, and has a square outer profile 50, and the outer profile 50 completely covers the conductive part and the insulating part of the insulation device 100*b*, and completely covers the first magnetic core 31, the second magnetic core 32, the first winding 33 and the second winding 34.

The invention can effectively solve the problem of electric field distortion at edge, and realize uniformity of the electric field through design of the edge of the insulation device.

The invention also can achieve the objects of uniformizing the electric field and reducing a volume occupied by the edge through further design optimization of the edge of the insulation device, such as through allowing the curved portions of the edge to satisfy a certain condition.

Exemplary embodiments of the invention have been shown and described in details. It shall be understood that the invention is not limited to the disclosed embodiments. Instead, the invention intends to cover various modifications and equivalent settings included in the spirit and scope of the appended claims.

What is claimed is:

1. An insulation device, comprising an insulating part, and at least one conductive part located on at least one surface of the insulating part, wherein, the at least one surface of the insulating part facing the at least one conductive part has a central concave shape; and a longitudinal section of the at least one conductive part comprises a straight portion in a middle portion of the longitudinal section and two curved portions extending outwardly from both ends of the straight portion, wherein the curved portions satisfy the following equation:

$$\begin{cases} x = A\left(\phi + \frac{1}{2}\left(e^{(\phi+i\varphi)} + e^{(\phi-i\varphi)}\right)\right) \\ y = A\left(\varphi + \frac{1}{2i}\left(e^{(\phi+i\varphi)} - e^{(\phi-i\varphi)}\right)\right) \end{cases},$$

$$\text{where, } A = \frac{d}{\pi},$$

d is an insulation thickness of the straight portion of the insulating part along the longitudinal section, i is an imaginary unit, a value range of Ø is (−∞, +∞), and a value range of φ is (0.5π, 0.56π].

2. The insulation device according to claim 1, wherein the at least one conductive part comprises a first conductive part and a second conductive part opposite to each other, the insulating part is disposed between the first conductive part and the second conductive part, and a first surface of the insulating part facing the first conductive part and a second surface of the insulating part facing the second conductive part have central concave shape.

3. The insulation device according to claim 1, wherein each of the curved portions is formed of at least two arc lines connected in turn, and a vertex of each of the arc lines falls into a range of curve defined by the equation.

4. The insulation device according to claim 1, wherein an outer end of each of the curved portions further forms an endpoint arc, an angle of the endpoint arc is no less than 180°, and a vertex of the endpoint arc is located on an outer side of curve defined by the equation.

5. The insulation device according to claim 1, wherein the curved portions corresponding to the at least one conductive part allow an electric field distortion rate at a region where both ends of the at least one conductive part are located to be less than a predetermined value.

6. The insulation device according to claim 1, wherein the insulating part is made of a solid insulating material, and the at least one conductive part is made of a conductive or semi-conductive material.

7. The insulation device according to claim 1, wherein the insulation device further comprises an outer profile having a section that is a circle or a square; and the outer profile surrounds the at least one conductive part and the insulating part, or the outer profile completely covers the at least one conductive part and the insulating part.

8. An electrical device, comprising:

the insulation device according to claim 1; and at least one electrical structure disposed corresponding to at least one conductive part of the insulation device.

9. The electrical device according to claim 8, wherein the at least one conductive part of the insulation device comprises a first conductive part and a second conductive part, and the at least one electrical structure comprises a high voltage structure disposed corresponding to the first conductive part, and a low voltage structure disposed corresponding to the second conductive part.

10. The electrical device according to claim 9, wherein a potential difference between the high voltage structure and the low voltage structure is greater than 1 kV, and forms an electric field in which the insulation device is disposed.

11. The electrical device according to claim 9, wherein the electrical device is a transformer comprising a first magnetic core, a second magnetic core, a first winding and a second winding;

the first winding is surrounded by the first magnetic core, and disposed corresponding to the first conductive part, and the second winding is surrounded by the second magnetic core, and disposed corresponding to the second conductive part;

wherein a top surface of the first magnetic core and a top surface of the second magnetic core are parallel and opposing each other, the first conductive part covers the top surface of the first magnetic core, and the second conductive part covers the top surface of the second magnetic core.

12. An insulation device, comprising an insulating part, and at least one conductive part located on at least one surface of the insulating part, wherein, the at least one surface of the insulating part facing the at least one conductive part has a central concave shape, wherein the at least one surface comprises a middle portion and an edge, and the middle portion extends along an axis direction to form the edge; and a longitudinal section of the at least one conductive part comprises a straight portion and two curved portions extending outwardly from both ends of the straight portion, wherein a longitudinal section of the middle portion corresponds to the straight portion, and a longitudinal section of the edge corresponds to the curved portions.

13. The insulation device according to claim 12, wherein the curved portions satisfy the following equation:

$$\begin{cases} x = A\left(\phi + \frac{1}{2}\left(e^{(\phi+i\varphi)} + e^{(\phi-i\varphi)}\right)\right) \\ y = A\left(\varphi + \frac{1}{2i}\left(e^{(\phi+i\varphi)} - e^{(\phi-i\varphi)}\right)\right) \end{cases},$$

$$\text{where, } A = \frac{d}{\pi},$$

d is an insulation thickness of the straight portion of the insulating part along the longitudinal section, i is an imaginary unit, a value range of Ø is (−∞, +∞), and a value range of φ is (0.5π, 0.56π].

14. The insulation device according to claim 13, wherein the at least one conductive part comprises a first conductive part and a second conductive part opposite to each other, the insulating part is disposed between the first conductive part and the second conductive part, and a first surface of the insulating part facing the first conductive part and a second surface of the insulating part facing the second conductive part have central concave shape.

15. The insulation device according to claim 14, wherein the first surface comprises a first middle portion extending along a first axis direction to form a first edge, a longitudinal section of the first middle portion corresponds to the straight portion of the first conductive part, and a longitudinal section of the first edge corresponds to the curved portions of the first conductive part;

the second surface comprises a second middle portion extending along a second axis direction to form a second edge, a longitudinal section of the second middle portion corresponds to the straight portion of the second conductive part, and a longitudinal section of the second edge corresponds to the curved portions of the second conductive part;

wherein the first axis direction is opposite to the second axis direction.

16. The insulation device according to claim 13, wherein each of the curved portions is formed of at least two arc lines connected in turn, and a vertex of each of the arc lines falls into a range of curve defined by the equation.

17. The insulation device according to claim 13, wherein an outer end of each of the curved portions further forms an endpoint arc, an angle of the endpoint arc is no less than 180°, and a vertex of the endpoint arc is located on an outer side of curve defined by the equation.

18. The insulation device according to claim 12, wherein the curved portions corresponding to the at least one conductive part allow an electric field distortion rate at a region where both ends of the at least one conductive part are located to be less than a predetermined value.

19. The insulation device according to claim 12, wherein the insulating part is made of a solid insulating material, and the at least one conductive part is made of a conductive or semi-conductive material.

20. The insulation device according to claim 12, wherein the insulation device further comprises an outer profile having a section that is a circle or a square; and the outer profile surrounds the at least one conductive part and the insulating part; or the outer profile completely covers the at least one conductive part and the insulating part.

21. An electrical device, comprising:

the insulation device according to claim 12;

at least one electrical structure disposed corresponding to at least one conductive part of the insulation device.

22. The electrical device according to claim 21, wherein the at least one conductive part of the insulation device comprises a first conductive part and a second conductive part, and the at least one electrical structure comprises a high voltage structure disposed corresponding to the first conductive part, and a low voltage structure disposed corresponding to the second conductive part.

23. The electrical device according to claim 22, wherein a potential difference between the high voltage structure and the low voltage structure is greater than 1 kV, and forms an electric field in which the insulation device is disposed.

24. The electrical device according to claim 22, wherein the electrical device is a transformer comprising a first magnetic core, a second magnetic core, a first winding and a second winding;

the first winding is surrounded by the first magnetic core, and disposed corresponding to the first conductive part, and the second winding is surrounded by the second magnetic core, and disposed corresponding to the second conductive part;

wherein a top surface of the first magnetic core and a top surface of the second magnetic core are parallel and opposing each other, the first conductive part covers the top surface of the first magnetic core, and the second conductive part covers the top surface of the second magnetic core.

* * * * *